March 25, 1969     W. E. MACDONALD     3,434,908

SEALING HEAD

Filed Nov. 12, 1965

INVENTOR.
WARREN E. MACDONALD

BY *Morse, Altman & Oates*

ATTORNEYS

March 25, 1969 W. E. MACDONALD 3,434,908
SEALING HEAD

Filed Nov. 12, 1965 Sheet 2 of 2

United States Patent Office 3,434,908
Patented Mar. 25, 1969

3,434,908
SEALING HEAD
Warren E. Macdonald, Seekonk, Mass., assignor, by mesne assignments, to Summerhayes Holdings Limited, a corporation of Canada
Filed Nov. 12, 1965, Ser. No. 507,331
Int. Cl. B32b *31/10, 31/18;* B29c *27/06*
U.S. Cl. 156—514                                   7 Claims

ABSTRACT OF THE DISCLOSURE

A device for heat sealing molded plastic spouts to a heat sealable web by means of a heated head having cutting edges for puncturing the web and having a portion pivotable about the remainder of the head to produce a center point suspension causing a uniform pressure distribution between web and spout around the periphery thereof.

---

This invention relates generally to heat sealing devices and more particularly is directed towards a new and improved head for use in heat sealing one stratum such as a heat sealable web to another heat sealable stratum such as a molded plastic spout.

In co-pending application Ser. No. 256,013, filed Feb. 4, 1963, now Patent No. 3,244,576 there is disclosed a method and apparatus for manufacturing flexible plastic bags with semi-rigid spouts attached thereto. Bags of this type typically are employed with corrugated paper board cartons for packaging bulk liquids and are fabricated from heat sealable thermoplastic sheet materials such as polyethlene, for example. The spouts used with bags normally are molded from a heat sealable plastic material and formed with a flange to which is bonded the sheet plastic by a heat sealing device. In the co-pending application there is shown and described a head for perforating a plastic web and heat sealing the margins of the web opening to the flange of the spout which is positioned automatically on the web opposite the head.

The present invention has for one of its objects the providing of improvements in heat sealing devices of the sort described in the foregoing application.

More specifically it is an object of this invention to provide improvements in heads of the sort employed for puncturing and heat sealing a flexible heat-sealable web to a semi-rigid heat-sealable element such as a spout.

A further object of this invention is to provide a self-leveling heat sealing head for use in bonding a heat-sealable web to a semi-rigid heat-sealable element positioned against the web.

More particularly this invention features a heat sealing head, comprising a support mounted for reciprocation to and away from a pre-positioned web and a die pivotally mounted to said support. The die is formed with heat sealing surfaces which lie substantially in the plane of the pivot point, whereby, when the head is brought to bear against the restrained web, the head will level itself against the web without side motion thereof. The head also features integral cutting elements as part of the die and serve to puncture the web and center the spout upon reciprocation of its head.

Figure 1:
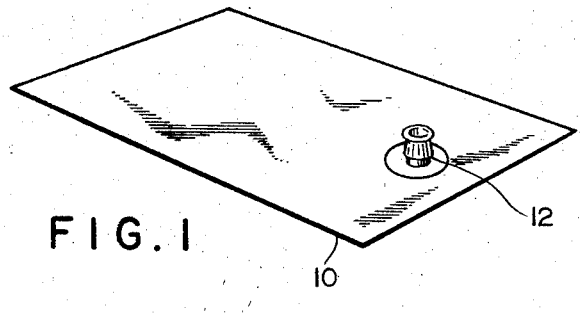

However, these and other features of the invention, along with further objects and advantages thereof, will become more fully apparent from the following detailed description of a preferred embodiment of the invention, with reference being made to the accompanying drawings, in which:

FIG. 1 is a view in perspective of a bag with an attached spout.

Figure 2:
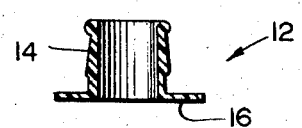
Figure 3:
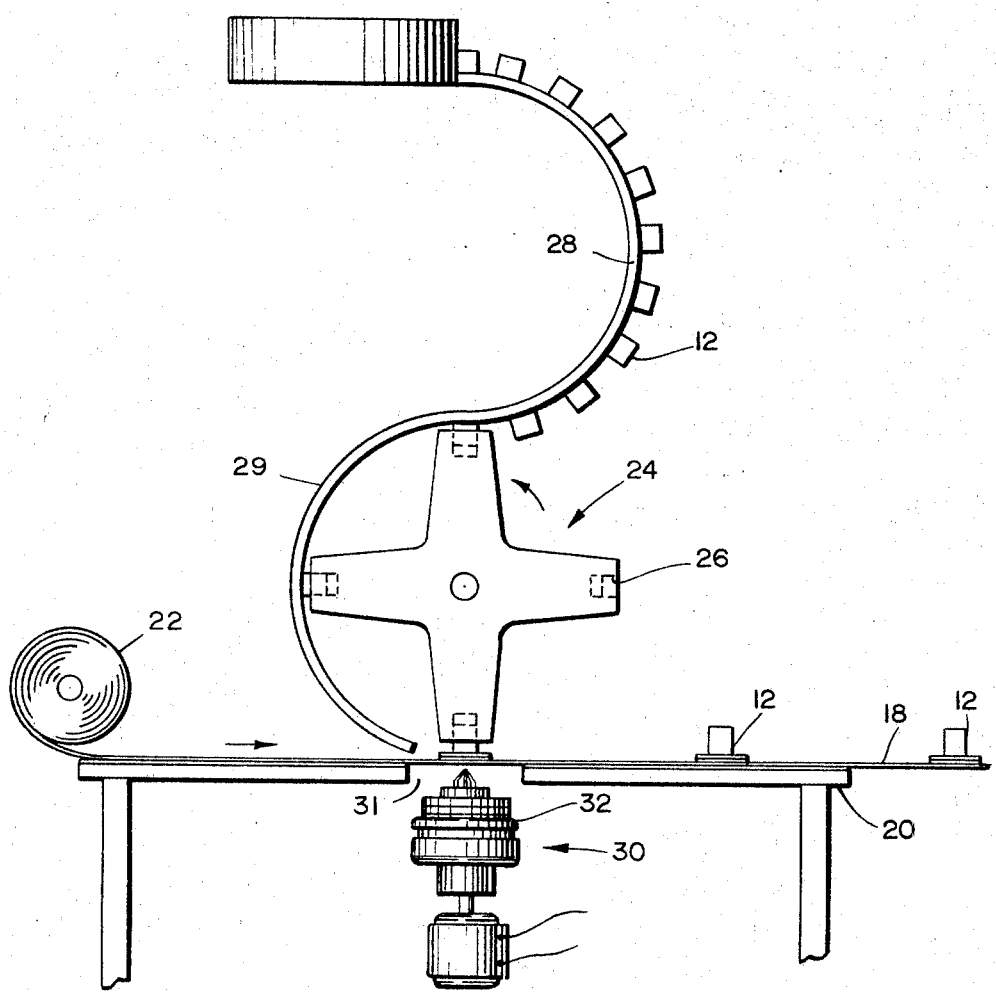
Figure 4:
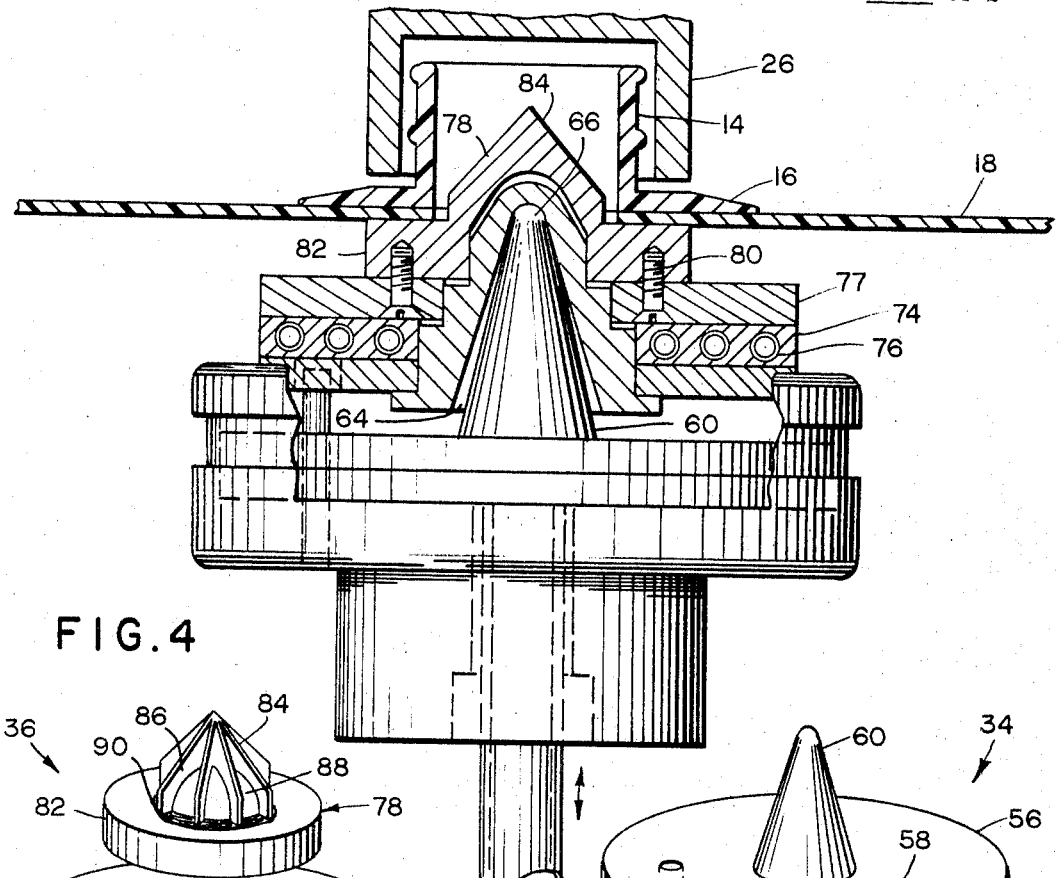
Figure 5:
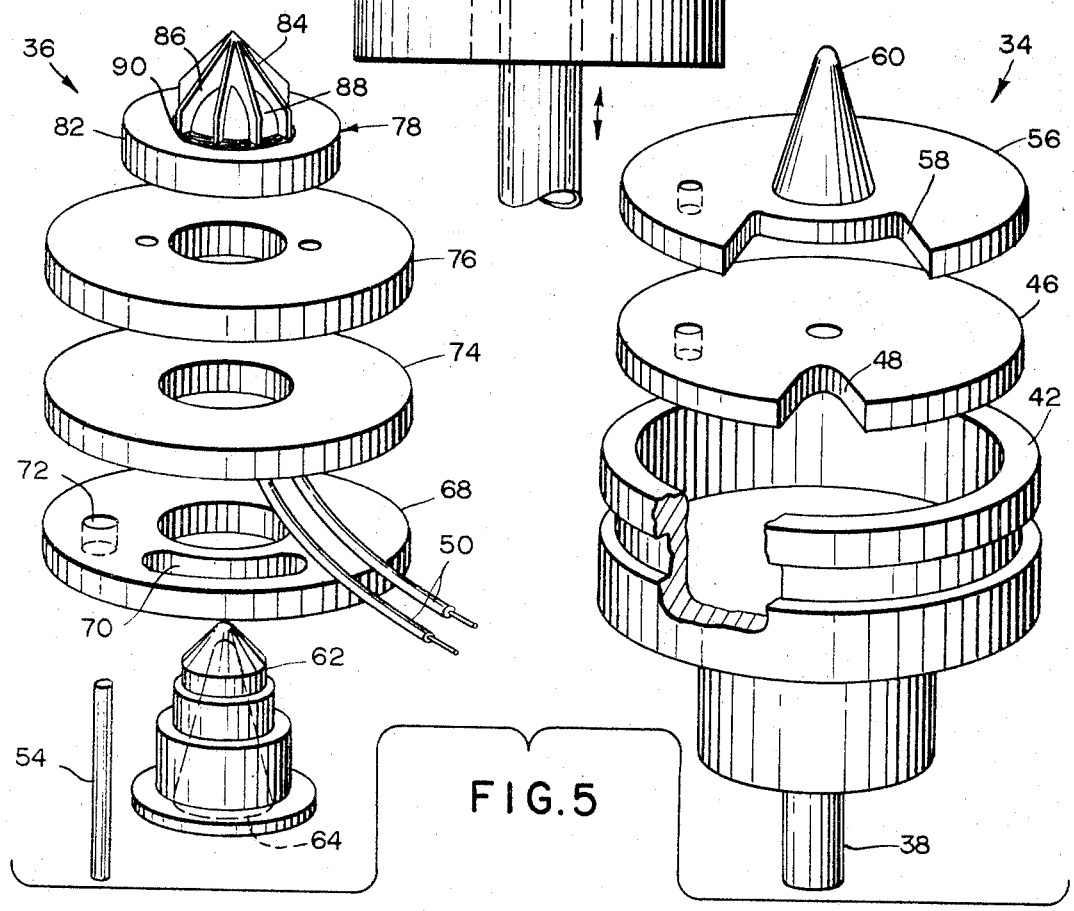

FIG. 2 is a sectional view in side elevation of a typical heat sealable spout such as shown attached to the bag in FIG. 1, FIG. 3 is a somewhat schematic side elevation of a mechanism for depositing and sealing a spout to a heat-sealable web, FIG. 4 is a detail sectional view in side elevation showing the heat sealing head assembly and portions of the apparatus shown in FIG. 3, and, FIG. 5 is an exploded perspective view of the heat sealing head.

Referring now to the drawings and to FIG. 1 in particular, reference character 10 generally indicates a bag formed of two or more plies of a heat sealable flexible plastic material such as polyethylene, for example, and having bonded to one side thereof a spout 12. As best shown in FIG. 2 the spout 12 is formed with a tubular portion 14 and an integral annular flange 16. In practice, the flange 16 is bonded by heat sealing to one wall of the bag and an opening is formed through the bag wall in register with the nozzle. The bag is, of course, sealed about its marginal edges.

In FIG. 3 there is shown an apparatus for depositing a nozzle 12 on one surface of a web 18 of a heat-sealable material. The apparatus in FIG. 3 generally corresponds with the nozzle positioning mechanism illustrated and described in co-pending application Ser. No. 256,013. The mechanism includes a horizontally flat table 20 over which the web 18 is drawn from a supply roll 22. The web is advanced in increments to the right as viewed in FIG. 3 and a nozzle is deposited on the web each time the web stops by means of an indexing wheel 24. The wheel 24 is provided with outwardly facing cups 26 arranged in evenly spaced relation and each of which is adapted to pick up a spout 12 from the lower end of a curved track 28 as the wheel 24 is indexed counter-clockwise as viewed in FIG. 3. As the wheel is indexed, a curved guide 29 holds the spout within the cup until it reaches its lower most position adjacent the table 20. It will be noted that the curved guide 29 terminates just above the upper reach of the table 20 and adjacent a table opening 31.

Mounted below the table in register with the opening 31 is a heat sealing mechanism indicated generally by the reference character 30 and including a head 32 adapted to vertically reciprocate into and out of engagement with that portion of the web 18 spanning the opening 31. The heat sealing head also aligns with whatever cup 26 has been indexed into position. It will also be understood that the web 18, which is also indexed along the table in synchronism with the wheel 24, will stop according to a predetermined schedule and the wheel 24 will index to a stop position depositing a spout 12 against the web 18 opposite the sealing head. The sealing head will then reciprocate upwardly against the contained spout, puncturing the web in the center of the spout sealing area, centering the spout over the area, and then heat sealing the web to the spout flange. When the heat sealing operation is completed, the head will reciprocate downwardly and the web together with the attached spout will advance to the right while the heel 24 indexes counter-clockwise. In subsequent operations another web of heat sealable material will be bonded to the web 18 to form a double walled bag and the bonded webs will then be separated into individual bags.

The heat sealing head 30, as best shown in FIGS. 4 and 5, is generally organized about a male base portion 34 and a female die portion 36. The male base portion is carried by a rod 38 connected to a suitable reciprocating actuating mechanism 40 such as a solenoid or pneumatic or hydraulic cylinder or other. Actuation of the reciprocating mechanism moves the head assembly upwardly or downwardly as previously described to puncture and heat seal the plastic web.

The male base portion 34 comprises a cup 42 formed with a cylindrical recess 44 in its upper end to receive an insulating plate 46 of asbestos or the like. The insulating plate 46 is generally circular but with a peripheral notch 48 to accommodate a pair of leads 50 which energize heating elements in the female die portion. The cup 42 is likewise formed with an opening 52 through which the leads pass. Fastened to the insulating plate 46 by means of a dowel pin 54 is a position post plate 56 peripherally notched at 58 and having mounted in the center thereof a conical positioning post 60 of bronze or the like. It will be noted that the post 60 is formed with a spherical top portion for reasons that will presently appear.

The female die assembly includes a flanged rocker 62 having a conical recess 64 formed at its lower end terminating in a spherical upper seat portion to accommodate the post 60. The conical recess 64 is somewhat wider than the conical post 60 to permit a limited rocking action of the female die assembly when mounted thereon. This is best shown in the cross-sectional assembly view of FIG. 4. The rocker 62 when mounted over the post seats on the spherical top of the post and is adapted to pivot about the vertical axis of the post. The spherical upper end of the post and the spherical seat of the rocker are concentric and the pivot point of the rocker, indicated by reference character 66, lies in the plane of the sealing surface of the web 18 when the head assembly is brought up against the web.

Assembled over the rocker 62 is a plate 68 cut away at 70 to accommodate the leads 50 and also formed with an enlarged opening 72 to accommodate the upper end of the dowel pin 54 which prevents rotation of the female die assembly with respect to the male base assembly. Assembled over the plate 66 is a heater 74 having embedded heating elements 76 energized through the leads 50. An annular brass plate 77 is positioned over the heater and is fixed to a die 78 by screws 80. The die 78 is formed with an annular flange 82 at its base and is recessed in the center of its lower face to receive the upper end of the rocker 62. Mounted centrally on the top of the die is an array of cutting elements 84. These cutting elements form a spider shaped structure in which the radial elements join at a center apex. The recessed center of the die forms an inner dome shape which defines openings 88 between adjacent cutting elements 86. In this fashion each cutting element is in the form of a flying buttress between the apex and the annular base. Formed around the cutting elements on the top surface of the flanged base 82 is an annular trough 90. In practice, the upper surface of the annular base 82 is coated with a suitable material such as a high temperature plastic of the sort sold under the trademark "Teflon" and the like, which will not adhere to the heated plastic web and yet is easily cleaned.

In operation, the apparatus functions in the following manner. Assuming a spout 12 is deposited on the web 18 as shown in FIG. 5. It will be understood that the indexing wheel will stop for a predetermined period as will the web 18. In this condition a cup 26 will be generally positioned over this spout. The sealing head will reciprocate upwardly so that the cutting die 76 will puncture the web 18 at the center of the spout, moving up into the tubular portion of the spout as shown in FIG. 4. The knife edges of the cutting die will form a series of slits through the web so as to form the needed opening opposite the spout. As the opening is made through the web, and the conically formed knife edges enter the spout the base of the conical form centers the spout over the sealing surface, the annular surface of the base 82 will move up against the underside of the web, pressing the marginal edges of the opening against the spout flange 16. Insofar as the cutting die is at an elevated temperature by reason of the heating ring that portion of the web in contact with the annular base 82 will be heat sealed to the spout flange. When the heat sealing operation is completed the sealing head reciprocates downwardly to permit the web and the now bonded spout to advance.

The cup 26 serves to restrain the spout against the upward pressure of the sealing head, holding it in position while the cutting and sealing operations take place. Insofar as the female die is pivotally mounted about a point lying substantially in the plane of the web the heat sealing surfaces provided by the die 78 will automatically parallel itself against the web so as to provide uniform contact and optimum heat transfer about the web opening. This center point suspension causes a uniform pressure distribution around the annular ring of the die. In this fashion, uniform heat seals between the web and spout may be made in each heat sealing operation despite any irregularities in the spout, web or supporting cup. If, for example, a spout is deposited on the web in a slightly tilted position the self-leveling die will still produce a perfect heat seal between the spout flange and the web. The cutting elements will also be automatically positioned to puncture the web in the most efficient manner.

It is further noted that the knife portion of the die is not necessary to the uniform pressure distribution function which is the major feature of this invention, and therefore it is not necessary that the web be punctured or that the second strata be a molded element. One instance is shown in the illustrated embodiment. Another typical embodiment would be a configured die mounted with its geometric center generally in line with described center suspension point, to allow a configured seal to be made between strata which could consist of a multiplicity of webs.

While the invention has been described with particular reference to the illustrated embodiment, it will be understood that numerous modifications thereto will appear to those skilled in the art. Accordingly, the above description and accompanying drawings should be taken as illustrative of the invention and not in a limiting sense.

Having thus described the invention what I claim and desire to obtain by Letters Patent of the United States is:

1. Apparatus for bonding two or more superimposed heat sealable strata including:
 (a) a conical member,
 (b) power means for vertically reciprocating said member into and out of contact with one side of said strata,
 (c) a die having a conical recess formed therein pivotally mounted on said member, said recess being dimensioned to permit limited angular movement of said die about a point lying substantially in the plane of said strata when said die is in contact therewith,
 (d) said die being formed with a heating surface for bonding said strata when reciprocated thereagainst.

2. Apparatus according to claim 1 wherein said heating surface lies in the plane of the apex of said conical member.

3. Apparatus according to claim 2 including cutting means located on said die centrally of said heating surface for forming an opening through at least one of said strata when said die is reciprocated thereagainst.

4. Apparatus according to claim 3 wherein said cutting means includes a plurality of radially arrayed elements each formed with sharpened edges and projecting upwardly from said heating surface to a central apex.

5. Apparatus for heat sealing two or more superimposed heat sealable strata including:
 (a) a head,
 (b) power means for reciprocating said head along a path perpendicular to said strata and into and out of contact therewith,
 (c) means mounting at least a portion of said head for angular movement about a point lying substantially in the plane of said strata when said head is in contact therewith,
 (d) the movable portion of said head being formed with a heated surface substantially coplanar with said point whereby said surface will level itself against said strata when reciprocated thereagainst, (e) said movable portion including cutting elements adapted to pierce at least one of said strata when said head is reciprocated thereagainst.

6. Apparatus according to claim 5 wherein said cutting elements are located centrally of said heated surface and project outwardly therefrom.

7. Apparatus for heat sealing a heat sealable web to a flanged heat sealable spout placed thereon, comprising:
(a) a heated head,
(b) power means for vertically reciprocating said head into and out of contact with said web,
(c) means mounting at least a portion of said head for angular movement about a point lying substantially in the plane of said web when said head is in contact therewith,
(d) the movable portion of said head being formed with a flat annular heating surface coplanar with said point whereby said surface will parallel itself against said web when reciprocated thereagainst, and
(e) an array of cutting elements disposed within said annular surface and projecting above the plane thereof to a center apex, said elements being adapted to urge said spout into a centered location relative to the annular heating surface and to form an opening in said web centrally of said spout as said annular heating surface bonds said web to the flanged portion of said spout.

References Cited
UNITED STATES PATENTS

| | | | |
|---|---|---|---|
| 3,035,510 | 5/1962 | Carpenter et al. | 156—583 |
| 3,174,892 | 3/1965 | Fichtner | 156—583 |
| 3,249,041 | 5/1966 | Johnson | 156—583 |

DOUGLAS J. DRUMMOND, *Primary Examiner.*

U.S. Cl. X.R.

156—583